United States Patent [19]

Harrold et al.

[11] Patent Number: 4,956,995
[45] Date of Patent: Sep. 18, 1990

[54] COMPACT RADIAL FORCE MEASURING APPARATUS FOR DETERMINING VARIATIONS IN RADIAL FORCE AROUND A TIRE AND RIM ASSEMBLY

[75] Inventors: David O. Harrold; Charles F. Powell, both of Fort Wayne, Ind.

[73] Assignee: Navistar International Transportation Corp., Chicago, Ill.

[21] Appl. No.: 465,687

[22] Filed: Jan. 16, 1990

[51] Int. Cl.⁵ .......................................... G01M 17/02
[52] U.S. Cl. ....................................................... 73/146
[58] Field of Search ................................. 73/146, 8, 9

[56] References Cited

U.S. PATENT DOCUMENTS 4,501,141 2/1985 Takayanagi et al. ................. 73/146

Primary Examiner—Donald O. Woodiel
Attorney, Agent, or Firm—F. David AuBuchon; Dennis K. Sullivan

[57] ABSTRACT

A compact radial force measuring apparatus for determining variations in radial force exhibited by a tire and rim assembly permits mounting of a tire and rim assembly on a rigidly mounted rotatable hub assembly. A rotatable drum having a diameter substantially smaller than that of the tire and rim assembly is disposed with its rotational axis parallel to the rotational axis of the hub assembly and is then brought into contact against a circumferential area of the mounted tire and rim assembly with a force that will load the tire and rim assembly to a desired level. The load force is measured by a force sensor such as a load cell. The tire and rim assembly and drum are then rotated, either manually or by other means, while holding the tire-to-drum center-to-center dimension constant. Variations in the force attempting to change the center-to-center dimension exerted by the tire and rim assembly against the drum are sensed, and recorded.

23 Claims, 3 Drawing Sheets

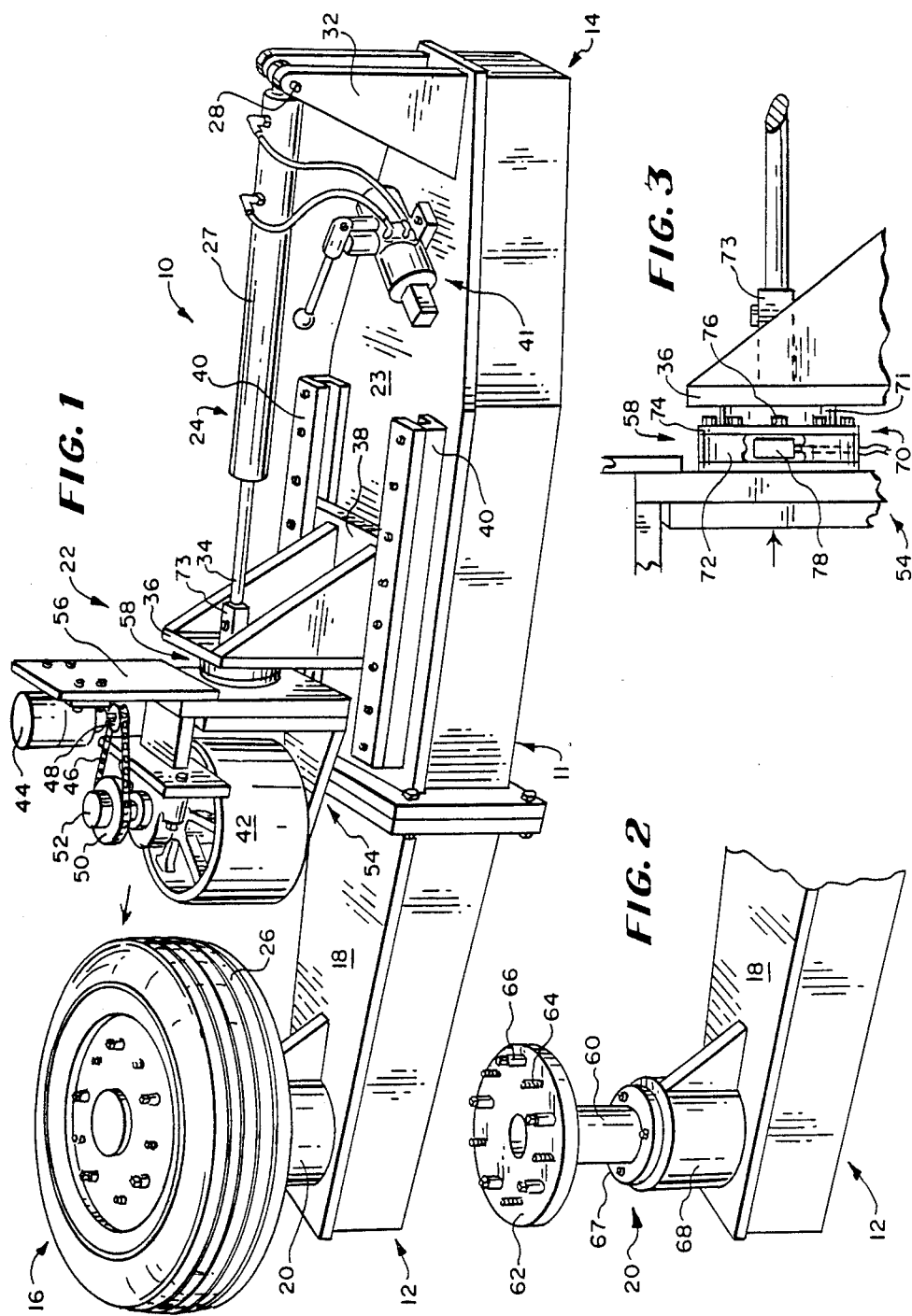

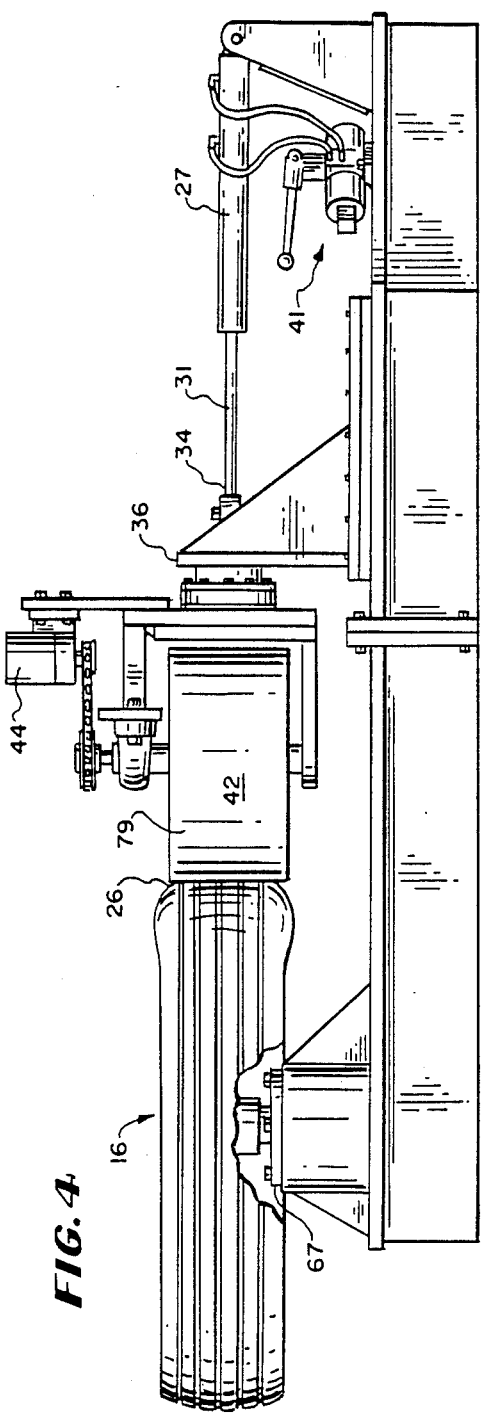
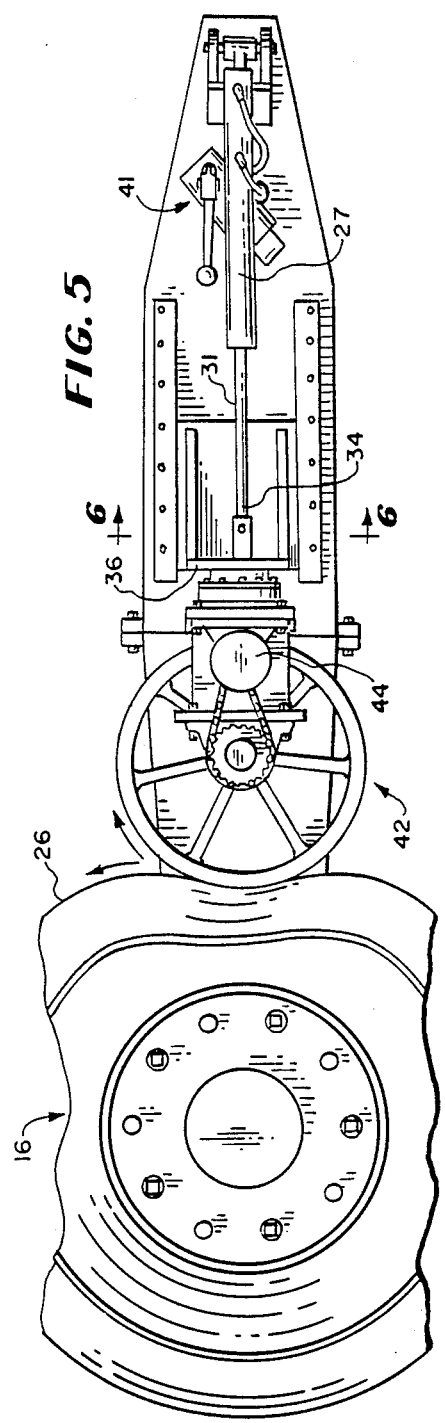

COMPACT RADIAL FORCE MEASURING APPARATUS FOR DETERMINING VARIATIONS IN RADIAL FORCE AROUND A TIRE AND RIM ASSEMBLY

BACKGROUND OF THE INVENTION

The present invention relates to an apparatus which is used for measuring the radial force at various locations along the circumference of a tire assembled on a wheel rim to determine the variations therein so that a tire and rim assembly having an area exhibiting an unsatisfactory variation in radial force from the rest of the assembly, which may cause unacceptable vehicle vibrations, may be detected and compensated for.

When a tire is out of round (with a 0.001 inch run-out being equivalent to approximately four pounds of radial force) due to non-uniform internal construction or due to an out-of-round rim, the tire, when rolling along a road surface, will exhibit a significant variation in the radial force existing at the ground contact patch, the circumferential area of the tire contacting the flat road surface at a particular point in time. In the worst cases, such variations in radial force may be in the range of 400 pounds of variation for a single tire, such as truck tire, while tires on passenger cars may exhibit a considerably lower variation in radial force measurements.

Since many trucks have dual tires on each rear axle wheel end, dual tires that are mounted so that their radial force variations are additive will impart a very high degree of vibration into the vehicle.

THE PRIOR ART

The tire industry presently has large apparatus, costing in excess of $200,000, for determining the radial force variations existing in truck tires. These machines measure the radial force variations only in the tire, which is generally held between a pair of rim halves mounted on mandrels, and not the complete tire and rim assembly as assembled for vehicle use. At least one of these machines has been modified for use in the laboratory to measure the radial force variation of the combined tire and rim assembly. To our knowledge, no compact device is available for measuring the radial force variations exhibited by the combined tire and rim assembly which may be used to service tire and rim assemblies in the field, as when installing a new tire on a rim in the aftermarket.

At the present time, the only tool available to the service mechanic is a dial indicator which is used to indicate whether a tire and rim assembly has a high degree of variation in its run-out (out-of-roundness). This indication only identifies a tire and rim assembly with a high run-out, while the two variables, radial run-out and radial force, are not always directly related, i.e., the variation in radial force may be high while run-out, as indicated by the dial indicator, is within acceptable limits. Thus, without the aid of an apparatus for measuring radial force directly, a tire and rim assembly which is causing unacceptable vehicle vibration, may go undetected.

One reason, aside from cost, why compact versions of these large machines have not been made available in the field may be that they incorporate a large drum which is pressed against the tire. The larger the diameter of the drum, the more its periphery approaches a planar surface similar to a road that the tire normally operates on. However, larger drums not only weigh more and have more bulk but also the supporting structure must be proportionately more massive, thereby precluding their use for service in the field or even at the average retail tire dealer. In the present invention, a drum having a diameter substantially smaller than the diameter of the tire is used to load and detect the radial force of the tire and rim assembly in the apparatus. Not only does this provide a much smaller machine but also, despite the fact making the drum smaller is moving away from the conditions that the tire would see in vehicle operation, the smaller diameter is felt to increase the accuracy in locating areas on the tire having large variations in radial force.

SUMMARY OF THE INVENTION

As will be described in greater detail hereinafter, the radial force measuring apparatus of the present invention provides a machine small enough to be used at the retail tire dealer to be portable for field service by which an area exhibiting an unsatisfactory radial force in a tire and rim assembly may be detected and compensated for.

According to the invention, our radial force measuring apparatus mounts a tire and rim assembly on a rotatable hub assembly having a fixed axis. A rotatable drum assembly having a drum diameter substantially smaller than that of the tire and rim assembly is mounted on a base with its rotational axis parallel to a rotational axis of the hub assembly. The drum is then brought into contact against the tire and rim assembly by a hydraulic cylinder arrangement with a force that will load the tire and rim assembly to one or more desired levels. The load force is monitored by a force sensing load cell. The tire and rim assembly and drum are then rotated, either manually or by other means, while holding the tire-to-drum center-to-center dimension constant. Variations in the force between the tire and rim assembly and the drum, are sensed and recorded relative to their position along the circumference of the tire, these variations being known as tire/rim radial force variations.

By use of the apparatus of the present invention, a bad tire and rim assembly due to variations in radial force can be detected and replaced or compensated for as by repositioning the tire on the rim or repositioning adjacent tire and rim assemblies if dual tires are being used.

BRIEF DESCRIPTION OF THE DRAWINGS

Other objects and advantages of the present invention will become more apparent upon reading the detailed description thereof and upon reference to the drawings, in which:

FIG. 1 is a perspective view of a radial force measuring apparatus of the present invention;

FIG. 2 is a perspective view of the rotatable hub assembly of the apparatus of FIG. 1;

FIG. 3 is a side view of a portion of the apparatus of FIG. 1, and, illustrates the provision of the force or load producing and sensing system thereof;

FIG. 4 is a side view of the apparatus of FIG. 1 showing a tire and rim assembly mounted on the rotatable hub assembly thereof and shows the rotatable drum of the load producing and sensing system of the apparatus exerting a load against the tire and rim assembly; FIG. 5 is a plan view of the apparatus of FIG. 1 and a portion of a tire and rim assembly mounted thereon the inward displacement of the tire and rim assembly by the drum being greatly exaggerated;

DESCRIPTION OF THE PREFERRED EMBODIMENT

Figure 6:
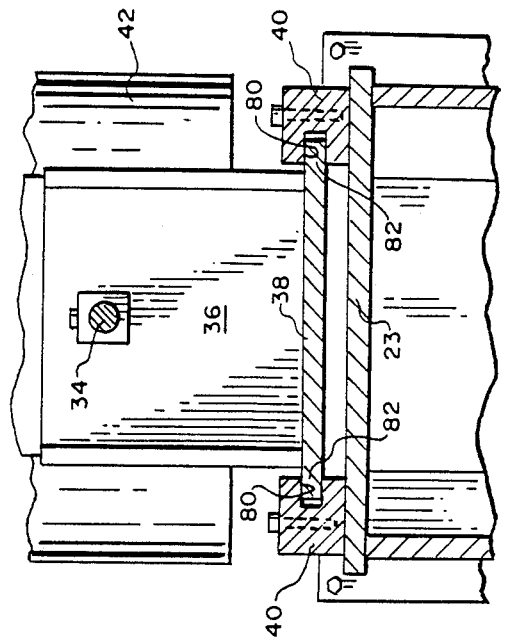
FIG. 6 is a cross-section of a portion of the apparatus of FIG. 1 taken along line 6—6 of FIG. 5 showing the mounting of the rotatable drum; and, FIG. 7 is a graph of a measurement of radial force in a tire and rim assembly, wherein the drum assembly has been pre-loaded with a force of 4,000 pounds, versus the arc degree location around the tire and rim assembly.

Referring now to the drawings in greater detail, there is illustrated in FIG. 1 the apparatus generally 10 for measuring radial force, and determining variations therein, as exhibited by a tire and rim assembly 16. As shown, the apparatus 10 includes a base member 11 comprising a tire mounting end 12 and a load producing and sensing end 14 which may be bolted together as shown to enhance the portability of the apparatus. Although the ends 12 and 14 are shown as comprising separate sections, they could be a single piece if portability is not important in a particular application as in a permanent installation at a retail dealer.

A tire and rim assembly 16, the radial force variations of which are to be detected, is mounted for rotation on a fixed axis on the tire mounting end 12 in a manner similar to that in which the tire and rim assembly 16 is mounted onto a vehicle. The tire and rim assembly 16 is elevated above a planar base 18 of the tire mounting end 12 by means of a rim mounting hub assembly 20 which may be welded or otherwise secured to the base 18. As shown in FIG. 2, the rim mounting hub 20 includes a rotatable hub element 60, preferably a standard wheel hub, which has a rotational axis parallel to a rotational axis of the rotatable drum 42 and incorporates a rim supporting flange 62 which is provided with mounting studs 64 thereon in a bolt circle disposed to fit into the rim bolt holes (not shown) of the tire and rim assembly 16. Once the tire and rim assembly is placed on the flange 62, nuts 66 are tightened on the bolts 64 to rigidly secure the tire and rim assembly 16 in place. The lower end of the rotatable hub element 60 is rotatably mounted as by tapered roller bearings (not shown) on a supporting wheel spindle, the lower flange thereof being shown at 67, which is fixedly mounted to a support member 68 fixed to the planar base platform 18, thus providing a fixed location for the axis of hub 60.

Referring now to the load producing and sensing end 14, there is illustrated therein a load producing and sensing apparatus generally 22 which is slidably supported on a planar base 23 and which is, by means of a piston and cylinder arrangement 24, movable toward and away from a circumferential surface 26 of the tire and rim assembly 16. A cylinder 27 of the piston and cylinder arrangement 24 is attached, as by pin 28 to a fixed mounting bracket 32.

The rod end 34 of the cylinder 27 is fixed to a vertical flange 36 carried on a sliding bracket member 38 which is slidably retained within two track sections 40 which are mounted on the planar base 23 and are positioned to allow for longitudinal movement of the vertical flange 36 relative to the base 23, toward and away from the tire mounting end 12, upon actuation of a manually or air operated hydraulic pump 41 supplying the piston and cylinder arrangement 24. As shown in FIG. 6, track sections 40 include a longitudinal groove 80 within which lateral edge portions 82 of bracket member 38 are slidably secured. One method of joining the track sections 40 to the planar base 23 is shown wherein bolts 84, extending through the thickness of the track sections 40 in an area lateral of the grooves 80, terminate within cavities (not shown) provided for receipt thereof within planar base 36.

The load producing and sensing apparatus 22 which is mounted to side of vertical flange 36 opposite the attachment of cylinder rod thereto as shown in FIG. 3, includes a rotatable drum 42 which is rotatably suspended on a C-shaped bracket 54 and which is driven by motor 44 through a sprocket chain 46 received around a drive gear 48 thereof and around a gear wheel 50 fixed to an extension of drum hub shaft 52 to rotate the drum 42 upon actuation of the drive motor 44. The drum 42 has an axial length at least equal to or greater than the tread width of the tire to be measured and diameter substantially smaller than that of such tire. For example, with a standard truck tire having a 40 inch diameter, an 18 inch drum 42 might be used. It is believed that the smaller drum diameter not only enhances the compactness of the apparatus (compared to manufacturers' machines) but also results in more accurately locating areas of abnormal radial force in the tire and rim assembly by reducing the area of contact and thus the influence of adjacent portions of the tire on the portion being measured.

As will be seen below, the C-shaped bracket 54 is mounted to the vertical flange 36 appropriately so that the drum 42 is elevated above the planar base 23 so as to lie in the horizontal plane of the mounted tire and rim assembly 16 and so that the load from cylinder 27 acts along a line connecting the center of the drum and the center of the tire and rim assembly. The mounting 58 for attaching the C-shaped bracket 54 to the vertical flange 36 further incorporates a force sensor to sense the force between the drum 42 and the tire and rim assembly 16.

As shown in FIG. 3, a load cell 70 having a cylindrical body portion 71 including an end flange 72 is provided. One end of the load cell 70 is secured to the contiguous vertical flange 36 by a large bolt 73 integral with the load cell extending therethrough. The end flange 72 and the contiguous C-shaped bracket 54 have an identical pattern of openings therein so that the load cell 70 may be secured to the bracket 54 by bolts 76 which are passed through the openings in the end flange 72 and into openings or bores formed in the bracket 54. As the bolts 76 are tightened, the bracket 54 and flange 36 are brought together as tightly as possible.

Within the structure of the load cell 70 is disposed a force sensor 78, for example, a set of strain gauges. One side of the force sensor 78 is attached to the vertical flange 36 and the other is attached to the bracket 54.

In FIG. 4, the radial force measuring apparatus 10 is shown being activated. In this respect, the hydraulic pump 41 has been activated to extend rod 31 out of cylinder 27. This extension applies pressure against vertical flange 36, sliding it leftward within the tracks 40. As vertical flange 36 moves leftward, it urges an outer surface 79 of the drum 42 into frictional contact with an area of the circumferential surface 26 of the tire and rim assembly 16 until a desired force of contact is produced, as sensed by the sensor 78. In other words, upon precise manipulation of the rod 31 out of the cylinder 27, the rotatable drum 42 is brought against the circumferential surface 26 of the tire and rim assembly 16 with a force that will load the tire and rim assembly 16 to a desired load level. The hydraulic system 41 is then locked to maintain the center-to-center dimension between the drum 42 and the tire and rim assembly 16 although the force will vary from the predetermined force as the drum and tire are rotated.

The drive motor 44 is then engaged, as better illustrated in FIG. 5, and begins to slowly rotate drum 42 which in turn, through frictional engagement against an area of the circumferential surface 26, rotates the tire and rim assembly 16. The load sensor 78 is operative and a sequence of measurements of radial force, defined as the separating force exhibited between the tire and rim assembly 16 and the load applying drum 42, is taken from the sensor 78 through a 360 degree arc travelled around the circumferential surface 26 of the tire and rim assembly 16 while maintaining a preloaded center-to-center dimension between the tire and rim assembly 16 and the drum 42. A rotary potentiometer may be provided to obtain the circumferential position information. This information may then be plotted in conjunction with the radial force to produce a graph as shown in FIG. 7.

Figure 7:
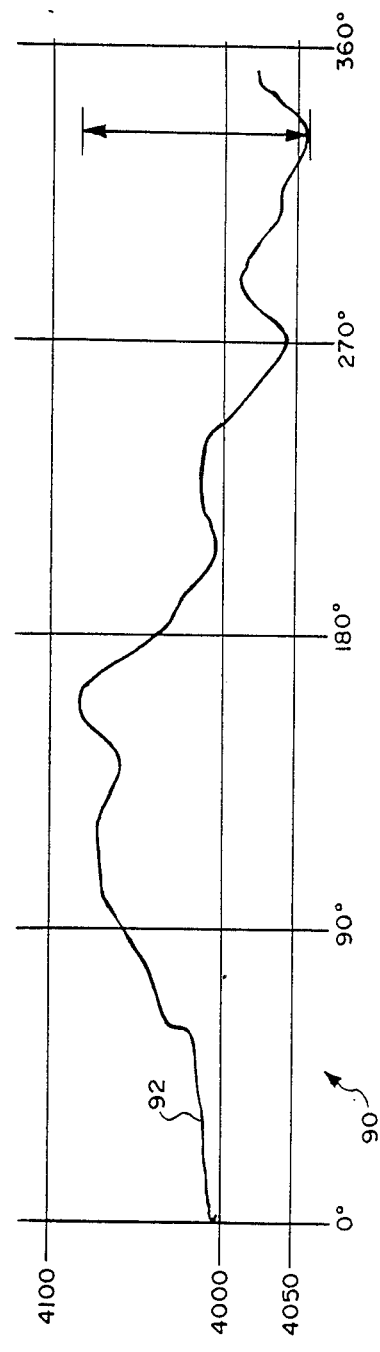

Inasmuch as measurements of radial force provided by the apparatus 10 will be utilized after removal of the tire and rim assembly 16 therefrom, it may be beneficial to have the ability to create a plot or graph 90, as shown in FIG. 7, of the radial force exhibited by the tire and rim assembly 16 along the circumferential surface 26 thereof. A start point along the surface 26 of the tire and rim assembly 16 is chosen and identified. Radial force measurements are then taken around the surface 26 of the tire and rim assembly 16 under predetermined load, in this case where the tire and rim assembly 16 is under a 4000 lb. load representing approximately 80% of the load on a fully loaded truck tire. A similar graph may also be made under a 1000 pound load representing the load on the rear tire of a tractor without a trailer. The latter condition is measured because the worst ride quality conditions due to tire 20 vibration occur at light loads.

The line 92 of FIG. 7, which shows the variations in radial force which might be exhibited by a particular tire and rim assembly 16 during operation of the apparatus 10 with a 4000 lb. initial load, is generated on a charting device such as a plotter and defines radial force exhibited in all areas around the circumferential surface 26 of the tire and rim assembly 16. As shown, the variation in radial force encountered within a single tire and rim assembly 16 might be spread over an expansive range. Such range of variation, if not compensated for, can cause a significant degree of undesired vibration.

By utilizing the apparatus 10 in conjunction with a dial indicator or equivalent device to measure the runout of the rim, the area on the tire and rim assembly 16 of greatest radial force can be detected and matched against an area of smallest radial dimension of the rim, thereby minimizing variation in the radial force of the tire and rim assembly 16.

Further, when a dual wheel assembly is involved, an area of increased radial force on one tire and rim assembly 16 may be detected and repositioned to an area of decreased radial force in the second tire and rim assembly 16 of the dual assembly, with such repositioning of one tire and rim assembly 16 relative to the other tire and rim assembly 16 acting to compensate for the variations in radial force.

The apparatus 10 of the present invention has a number of advantages, some of which have been described above and others of which are inherent in the invention. Also, modifications can be made to the apparatus 10 without departing from the teachings of the present invention. For example, rather than rotating the drum 42 as taught above, the tire and rim assembly 16 could be rotated by the hub 60 through a suitable driving apparatus therefor. Accordingly, the scope of the invention is only to be limited as necessitated by the accompanying claims.

We claim:

1. A compact radial force measuring apparatus for use in determining the radial force variation exhibited by a tire and rim assembly of a vehicle wheel comprising:

a base member;

a rim mounting flange rotatably mounted on said base member for rotation about a fixed axis, said flange being adapted to receive a tire and rim assembly;

rotatable drum means movably mounted on said base member for selective contact with the circumference of a tire and rim assembly mounted on said flange, said drum means having a diameter less than the diameter of said tire and rim assembly;

force applying means associated with said rotatable drum means for moving said rotatable drum means against said circumference of said tire and rim assembly, said force applying means being disposed to maintain a constant center-to-center distance between said tire and rim assembly and said rotatable drum means subsequent to the application of an initial predetermined force;

means for causing relative rotation between said rotatable drum means and said tire and rim assembly; and, sensing means for measuring the force existing between said tire and rim assembly and said rotatable drum means at a plurality of points around the circumference of said tire and rim assembly.

2. The apparatus of claim 1 wherein said rim mounting flange is integrally attached to a hub rotatably supported on a fixed spindle.

3. The apparatus of claim 2 and said spindle including a flange mounted to a support member a predetermined distance above said base member so that said rotational contact means is frictionally engageable with a tire and rim assembly mounted on said flange.

4. The apparatus of claim 2 wherein said rim-supporting flange incorporates studs circumferentially placed on a rim-supporting surface thereof, over which rim bolt openings are receivable.

5. The apparatus of claim 1 wherein said rotatable drum means comprise a cylindrical drum having a rotational axis parallel to the rotational axis of said tire and rim assembly mounting means.

6. The apparatus of claim 5 wherein said cylindrical drum has an axial dimension greater than or equal to the tread width of said tire.

7. The apparatus of claim 6 wherein said drum is rotatably mounted on a support yoke fixed to a bracket member slidingly mounted to said base member for movement toward and away from said tire and rim assembly.

8. The apparatus of claim 7 wherein a load cell is attached to and between said support yoke supporting said drum and said bracket member.

9. The apparatus of claim 7 wherein said bracket member is mounted to said base member by C-shaped track sections disposed to receive the lateral edges of said bracket member.

10. The apparatus of claim 6 wherein said rotatable drum is elevated a predetermined distance above said base member so that a circumference thereof is frictionally engageable with a tire and rim assembly mounted on said apparatus.

11. The apparatus of claim 1 wherein said force applying means comprises a linear actuator operatively disposed to apply force to said rotatable drum means along a line intersecting the centers of rotation of said tire and rim assembly and said rotatable drum means.

12. The apparatus of claim 11 wherein said linear actuator comprises a hydraulic cylinder.

13. The apparatus of claim 11 wherein said linear actuator is selectively locked in position to maintain the center-to-center distance between the tire and rim assembly and the rotatable drum means.

14. The apparatus of claim 1 wherein said means causing relative rotation comprise a drive motor mechanically coupled to said rotatable drum means for causing rotation thereof.

15. The apparatus of claim 1 wherein said means for sensing force applied by the tire and rim assembly against said rotatable drum means comprises a load cell operatively disposed between said rotatable drum means and said base member.

16. The apparatus of claim 15 wherein said load cell is attached to and between a support yoke supporting said rotatable drum means and a bracket member slidably disposed on said base member.

17. The apparatus of claim 1 including a charting device functionally engaged to said sensing means.

18. The apparatus of claim 1 including a dial indicator functionally engaged with said rim.

19. The apparatus of claim 1 including a dial indicator functionally engaged with said tire.

20. The apparatus of claim 1 further including means for disengaging said sensing means after sensing has taken place through a 360° arc.

21. A radial force measuring apparatus for use in determining the radial force variation exhibited by a tire and rim assembly of a vehicle wheel comprising:
   a base member;
   a rim mounting flange rotatably mounted on said base member for rotation about a fixed axis, said flange being adapted to receive a tire and rim assembly;
   a rotatable drum having a cylindrical periphery of a diameter less than the diameter of said tire and rim assembly, said drum being mounted for rotation about an axis laterally movable on said base member and parallel to said fixed axis for selective contact with the circumference of a tire and rim assembly mounted on said flange;
   force applying means operatively associated with said drum and acting along a line between said axes for moving said drum against said circumference of said tire and rim assembly, said force applying means being disposed, upon establishing a desired load between said drum and said tire and wheel assembly, to maintain a constant center-to-center distance between said tire and rim assembly and said drum while permitting variations in the force therebetween; and,
   load sensing means for measuring the force existing between said tire and rim assembly and said rotatable means at a plurality of points around the circumference of said tire and rim assembly.

22. The apparatus of claim 20 and said force applying means comprising a hydraulic cylinder and pump means for controlling said cylinder.

23. The apparatus of claim 21 and said pump being manually operated.

* * * * *